United States Patent [19]

Cotts et al.

[11] Patent Number: 5,274,070

[45] Date of Patent: Dec. 28, 1993

[54] IRON-SCHIFF BASE MAGNETIC POLYMERS AND PROCESS THEREOF

[75] Inventors: David B. Cotts, Osaka, Japan; Louisa M. Brodrecht, Menlo Park, Calif.; Robert C. Bening, Jr., Sunderland, Mass.

[73] Assignee: Osaka Gas Company, Ltd., Osaka, Japan

[21] Appl. No.: 698,410

[22] Filed: May 10, 1991

Related U.S. Application Data

[62] Division of Ser. No. 221,794, Jul. 22, 1988, abandoned.

[51] Int. Cl.$^5$ .................... C08G 12/00; C08G 12/04; C08G 14/00; C08F 283/00
[52] U.S. Cl. .................... 528/229; 525/471; 525/472; 528/266
[58] Field of Search ............... 525/471, 472; 528/229, 528/266

[56] References Cited

U.S. PATENT DOCUMENTS

| | | | |
|---|---|---|---|
| 4,639,496 | 1/1987 | Weddigen et al. | 525/506 |
| 4,851,303 | 7/1989 | Madou et al. | 429/13 |
| 5,015,699 | 5/1991 | Cotts et al. | 525/471 |

OTHER PUBLICATIONS

Park et al., "Films, Manufacture," Encyclopedia of Polymer Science and Technology, vol. 7, pp. 88-106, 1987, Wiley and Sons, N.Y.

*Primary Examiner*—John Kight, III
*Assistant Examiner*—T. Mosley
*Attorney, Agent, or Firm*—Phillips, Moore, Lempio and Finley

[57] ABSTRACT

The present invention relates to a magnetically active organometallic Schiff base polymer having a molecular weight of between about 4,000 and 50,000 daltons. In an additional aspect, the present invention relates to a process for the preparation of magnetically active organometallic polymer having a molecular weight of between about 4,000 and 50,000 daltons, wherein the polymer comprises a multiplicity of Schiff base tridentate chelating groups having the capacity to combine with the iron (II) or iron (III) ion of an organic salt, which process comprises:

(a) combining at least one organic diamine including hydrazine with at least one organic diketone or dialdehyde in an anhydrous dipolar aprotic solvent for a time sufficient to produce to polymer at a temperature of between about 50° C. and 200° C.;

(b) optionally recovering the polymer produced in step (a);

(c) combining the polymer of step (b) with a solution of an iron ion for a time sufficient to produce the organometallic polymer;

(d) recovering the organometallic polymer of step (c);

(e) heating the organic polymer up to about 200° C. for a time sufficient to observe at least a five-times increase in magnetic susceptibility which is retained when the organometallic polymer is cooled to ambient temperature or below; and (f) recovering the magnetically enhanced organometallic polymer of step (e). These polymers are useful as optical magnetic information storage devices.

16 Claims, 10 Drawing Sheets

IRON-SCHIFF BASE MAGNETIC POLYMERS AND PROCESS THEREOF

This is a division of Ser. No. 221,794, filed Jul. 22, 1988, U.S. Pat. No. 5,015,699.

BACKGROUND OF INVENTION

1. Field of Invention

The present invention relates to iron containing Schiff Base magnetic polymers and the process to prepare these polymers. The polymers have an enhanced permanent magnetic susceptibility which is useful in the fabrication of optical-magnetic information storage devices and for other magnetic film uses.

2. Description of the Related Art

A number of workers have examined metal containing materials for use as magnetic films for information storage devices. See, for example, "Thin Film Magnetic Materials" by J. Wernick and G. Chin in *Kirk-Othmer: Encyclopedia of Chemical Technology*, Volume 14, pp. 686, published by John Wiley and Sons of New York in 1983. Also "Organometallic Polymers" by C. Carraher, *Journal of Chemical Education*, 58 (11) 921 (1981) discloses organometallic polymers which usually have simple paramagnetism or diamagnetism.

More specifically, F. Lions and K. Martin in the *Journal of the American Chemical Society*, Volume 79, p. 273 (1957) disclose the preparation of Schiff base polymers in aqueous solution having fairly low molecular weight, and the first example of magnetic exchange.

T. Sugano et al., in *Chemical Communications*, Vol. 45, pg. 99 (1983) disclose the aqueous preparation of low molecular weight polymers of Schiff bases to which are added various iron salts in aqueous solution. The polymers are generally crumbly powders.

Very recently, T. Sugano et al., in the Bulletin of the Chemical Society Japan, Volume 59, p. 2615 (1986) disclose the re-examination of the preparation of Schiff base polymers in aqueous solution which have fairly low molecular weights. When the Schiff base polymer is added to the aqueous iron solution, iron ion is added to the polymer and the combination then has magnetic capabilities. The polymers are generally crumbly powders.

None of these references individually or in combination disclose or suggest the present invention.

It is therefore very useful to have a process to prepare a magnetic enhanced iron-Schiff Base polymer as a useful film which has enhanced magnetically susceptibility which is useful for magnetic storage of information.

SUMMARY OF INVENTION

Most generally the present invention relates to a Schiff base iron chelate polymer having a molecular weight of between about 4,000 and 50,000 daltons and a magnetic susceptibility ($\times$g) of between about $1\times10^{-6}$ cc/g and $1\times10^{-2}$ cc/g at ambient temperature.

In another aspect, the present invention relates to a process for the preparation of a magnetically active organometallic polymer having a molecular weight of between about 4,000 and 50,000 daltons, wherein the polymer comprises a multiplicity of Schiff's base tridentate chelating groups having the capacity to combine with the iron (II) or (III) ion of an inorganic salt, which process comprises:

(a) combining at least one organic diamine, which diamine group also includes hydrazine, with at least one organic diketone or dialdehyde in an anhydrous dipolar aprotic solvent for a time sufficient to produce the polymer at a temperature of between about 50° and 200° C.;

(b) optionally recovering the polymer produced in step (a);

(c) combining the polymer of step (b) with a solution of an iron ion for a time sufficient to produce the organometallic polymer;

(d) recovering the organometallic polymer of step (c);

(e) heating the organometallic polymer up to about 200° C. for a time sufficient to observe at least five-times increase in a magnetic susceptibility which is retained when the organometallic polymer is cooled to ambient temperature or below; and (f) recovering the magnetically enhanced organometallic polymer of step (e).

Preferably, in step (a) above in the formation of the Schiff base polymer, the water produced is continuously removed. More preferably, activated molecular sieves and/or an azeotroping solvent are used to remove the water as it is produced.

BRIEF DESCRIPTION OF THE DRAWINGS

In all of the infrared spectra below % absorbance is on the vertical axis and the wavelength is on the horizonal axis.

FIG. 5 is the infrared spectrum of the Schiff base polymer of 2,6-diacetylpyridine and hydrazine prepared in dimethylformamide.

DETAILED DESCRIPTION OF THE INVENTION AND PREFERRED EMBODIMENTS

In the present invention, comparison experiments were made preparing Schiff base polymers of the art, (e.g. the Lions, et al., and Sugano et al., references above) in aqueous solution, anhydrous solvents and also under conditions which removed any water present or produced during the polymerization.

As shown in the Examples below, the aqueous preparations produced powdery, or chunk-like polymers. Those polymers produced in anhydrous solvents showed some improved properties, but did not produce rubbery polymers. However, a surprising result occurred when the Schiff base polymers were produced under anhydrous conditions which, most importantly, also continuously removed any water produced during the polymerization of these polymers. When cast in a solvent on a surface, these polymers produced flexible useful films. After iron (II) or iron (III) was added in an organic solvent such as DMF, DMAC, etc. or water or aqueous mixtures of solvents, the organometallic polymer produced on removal of the solvent was tough, flexible film having magnetic properties.

The Schiff base reaction of the present invention is the reaction of a diketone (or dialdehyde) with a diamine as shown:

to produce a polymer having molecular weights to between about 4,000 and 50,000 daltons, preferably between about 10,000 and 50,000 daltons.

In this case $R^2$ and $R^3$ are alkyl groups each independently having from 1 to 12 carbon atoms, preferably 1-6 carbon atoms.

The magnetic polymer of the present invention wherein in the organic diketone or dialdehyde portion $R^2$—(C=O)—$R^1$—(C=O)—$R^3$, $R^2$ and $R^3$ are each independently alkyl groups having 1 to 12 carbon atoms.

$R^1$ is a heteroaromatic group having a nitrogen atom in it. Preferably, $R^1$ is a nitrogen aromatic compound having the carbonyl groups in the 2,6 - positions, e.g.:

The aromatic or heterocyclic ring may be substituted with $R_5$ and $R_6$ which are each independently selected from —H, $CH_3$—, $CH_3CH_2$—, $CH_3CH_2CH_2$—, —F, Cl, or Br.

In organic diamine, $H_2N$—$R^4$—$NH_2$, $R^4$ may be a direct bond, i.e. hydrazine, or may be an aliphatic group, an alkylene (e.g. methylene, hexamethylene) having preferably from 1 to 12 carbons. A preferred group has from 0 to 6 carbon atoms. A preferred embodiment is the magnetic polymer wherein in the organic diamine portion $R^4$ between about 1 and 12 carbon atoms.

In the above Schiff bases, $R^2$ and $R^3$ are also each independently hydrogen. In other words, a diketone or dialdehyde is coupled with a diamine to produce a Schiff base polymer. Also, an aldehyde-ketone where one of $R^2$ and $R^3$ is an aldehyde and the other is a ketone is also contemplated in the present invention.

An important feature of the present invention is that the reaction materials and environment be kept as anhydrous as possible during the reaction so that somewhat higher molecular weight polymers of the order of about 10,000 to 25,000 daltons are obtained.

The molecular weights of the polymers are determined or estimated according to the references:

D. B. Cotts et al., *Macromolecules*, Vol. 14, p.930 (1981) and R. Garmon in Chapter 3, "End Group Determination", *Polymer Molecular Weights*, Part I, (D. Slade, ed.), Marcel Dekker, New York, N.Y., published in 1975, both of which are incorporated herein by reference.

An additional key feature is that the reaction (polymerization) mixture is subjected to conditions such that any water generated during the reaction is continuously removed during the polymerization to produce higher molecular weight polymers of the order of about 10,000 to 50,000 daltons. The anhydrous conditions may be obtained using activated molecular sieves or the like. A preferable method is to conduct the polymerization in a solvent or a mixture of solvents which produce an azeotrope with water, which is distilled from the reaction mixture. Preferably the solvents are each independently selected from N-methylpyrrolidone, dimethylformamide, dimethyl acetamide, dimethylphosphoramide, benzene, toluene, chloroform, ethanol or mixtures thereof. More preferably, N-methylpyrrolidone and/or toluene are used.

Generally, anhydrous aprotic high boiling solvents, such as N-methylpyrrolidone, etc., are used as a mixture with lower boiling components for creating an azeotrope with water, such as benzene, toluene, ethanol, chloroform and the like.

After the formation of the high molecular weight Schiff base polymer, iron (II) or iron (III) is added generally in an aqueous medium. The amount of iron (II) or iron (III) added is about 4 to about 30% by weight based on the total weight of the iron and the high molecular weight Schiff base polymer. The Schiff base - Iron tough polymer now has a magnetic susceptibility of about $1 \times 10^{-4}$ cc/g.

When this iron-containing magnetic Schiff base polymer, which is a useful tough film, is heated to about 200° C. and held for about 1-minute, the magnetic susceptibility increases from $1 \times 10^{-4}$ to $6 \times 10^{-4}$ cc/g. Under some conditions, e.g. if the polymer has a high molecular weight in the above-defined range, the obtained film has rubbery properties. For instance, if only a small of iron (II) or iron (III) is present, e.g. between about 4 and 10 percent by weight of the total iron ion and polymer, the film retains some of its rubbery properties. However, as the amount of iron (II) or iron (III) increases beyond the specified amount, e.g. between about 10 and 30 percent by weight of the total, the rubbery properties of the polymer decline. While a 5 to 10 times enhancement in magnetic susceptibility is usually observed, a 150 times enhancement therein may be exhibited depending upon conditions (See FIG. 10). Preferably, 5 to 100 times (especially 5 to 10 times) enhancement is observed.

The rubbery polymer has a magnetic suspectibility of between usually about $1 \times 10^{-6}$ cc/g and $1.2 \times 10^{-3}$, preferably between about $1 \times 10^{-6}$ cc/g and $6 \times 10^{-4}$ cc/g, more preferably between about $10^{-6}$ cc/g and $6 \times 10^{-4}$ cc/g, especially $6 \times 10^{-4}$ cc/g.

The surprising permanent residual enhancement of the magnetic susceptibility of the organometallic polymer is extremely useful in the storage of information in optical magnetic devices.

The following Examples are intended to be illustrative and descriptive only, and are not to be construed as to be limiting in any way.

Table 1 shows a matrix to better explain the Examples and their relationship to each other. For example, Example 1 shows the Schiff base polymer of a diketone and a diamine which is used in Example 6 with the addition of iron (II) in aqueous solution, anhydrous solvent, etc.

TABLE 1

SCHIFF BASES CORRELATION OF THE EXAMPLES OF COMBINATION OF CARBONYL TYPES, PRODUCT ORGANIC POLYMER, AND TYPE OF IRON SOLUTION SCHIFF BASE POLYMERS PRODUCED BY EXAMPLES

| POLYMER PRECURSOR CARBONYL TYPE | ORGANIC POLYMER | METALLO ORGANIC POLYMER | IRON SOLUTION |
|---|---|---|---|
| DIKETONE | Ex. 1[a] | Ex. 6 | aqueous |
| DIKETONE | Ex. 2 | Ex. 7 | anhydrous |
| DIALDEHYDE | Ex. 3 | Ex. 8 | aqueous |
| DIALDEHYDE | Ex. 4 | Ex. 9 | anhydrous |

[a]Example 1, etc.

In these examples, the Schiff base polymer is prepared under aqueous, anhydrous, or anhydrous (with continuously removed water) conditions. The iron ion is then subsequently added under both anhydrous and aqueous conditions.

Preferably, the molecular weight range of the Schiff base polymer prepared under anhydrous conditions (with continuous removal of water) is between about 10,000 and 50,000 daltons, more preferably between about 4,000 and 25,000 daltons, especially between about 10,000 and 25,000 daltons.

The materials and solvents described herein are obtained from standard chemical supply houses, such as Aldrich Chemical Company, Milwaukee, Wis. and are used as received unless otherwise noted.

EXAMPLE 1

Schiff Base Preparation

Polymer Prepared With Water Present (Diamine and Diketone)

(a) The general procedure of Lions and Martin [JACS, 79, 2733 (1957)] was followed.

To an Erlenmeyer flask containing 33 ml of dimethylformamide is added 1,6-diaminohexane, 5.0 g (0.043 mol). This mixture is magnetically stirred and heated gently to produce complete solution.

Figure 1:
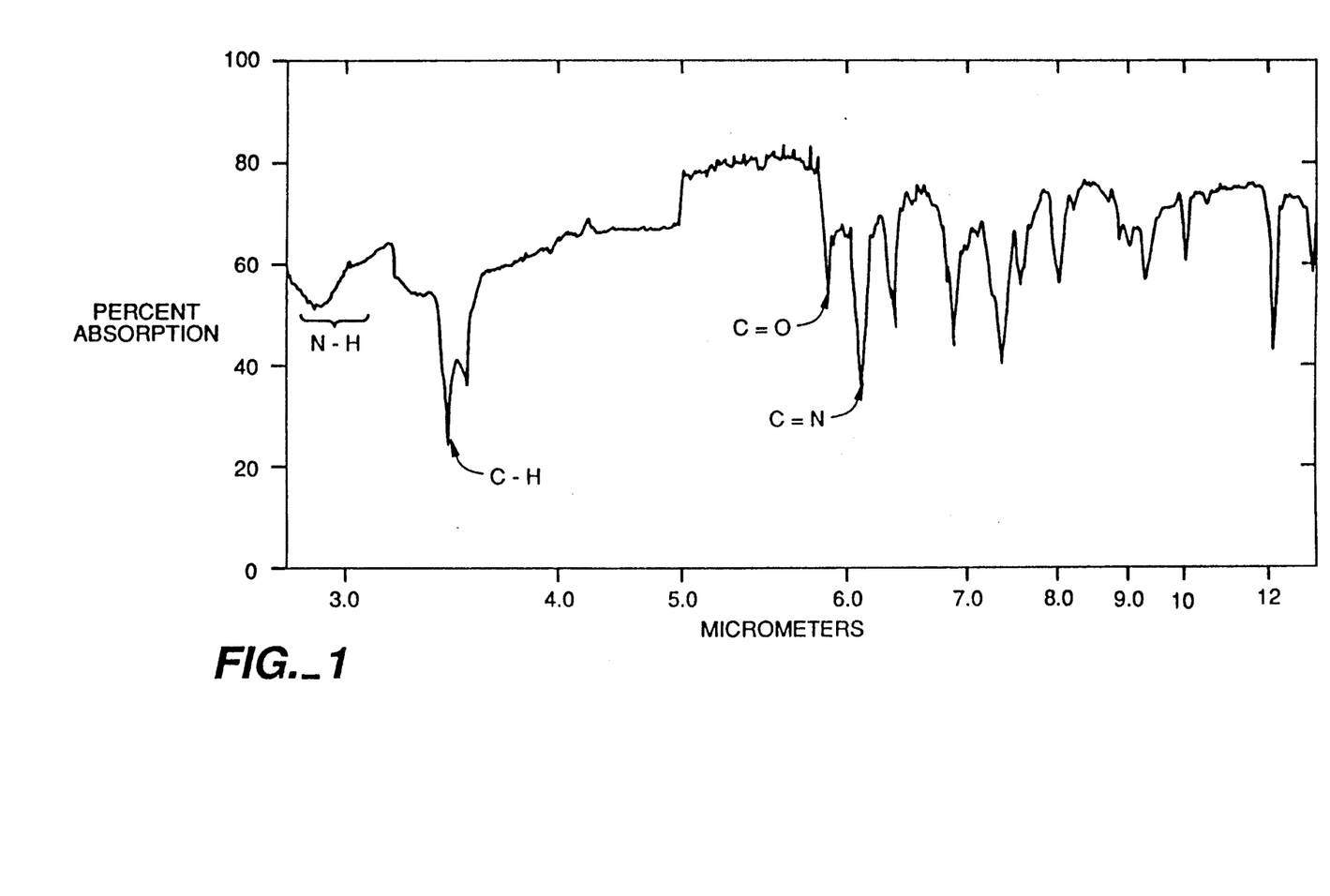
FIG. 1 is the infrared spectrum of the Schiff base polymer prepared in dimethylformamide (DMF).

1,6-Diacetylpyridine, 7.0 g (0.043 mol) is placed in a 250-ml round bottomed one-necked flask with 33-ml of dimethylformamide. A nitrogen blanket is used and the solution is heated to reflux until complete solution is obtained, the 1,6-diaminohexane prepared above is added, and the solution is stirred at reflux temperature for 1-hr. The reaction solution starts as a very light yellow solution, becoming increasingly darker to become a yellow-brown. After cooling for about 0.5 hrs, a dark solid precipitates. The solid is filtered and rinsed quickly with dimethylformamide. The filtrate is allowed to stand overnight and refiltered. The solid is placed in a vacuum chamber to dry overnight (about 16-hr.). The dry product is a light-yellow crumbly powder, 6.1 g, 58.7% yield. The infrared spectrum is shown in FIG. 1.

Figure 2:
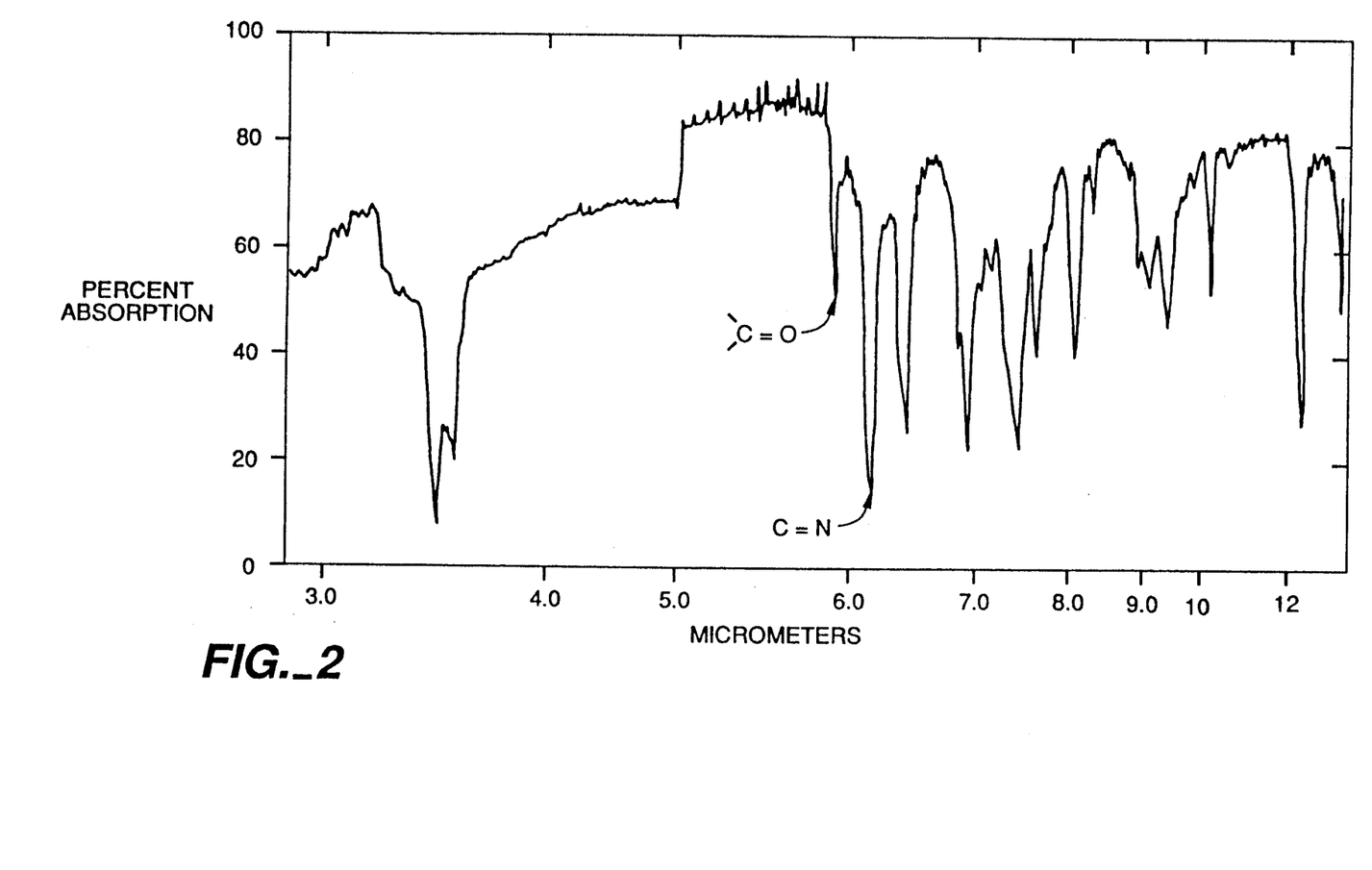
FIG. 2 is the infrared spectrum of the Schiff base polymer prepared in absolute ethanol.

(b) The procedure of Example 1(a) is repeated except that 33-ml of dimethylformamide is replaced with 40-ml of ethanol. The ethanol was boiled to reduce the volume and obtain the solid polymer. The infrared spectrum shown in FIG. 2 is essentially identical to the spectrum in FIG. 1.

Figure 3:
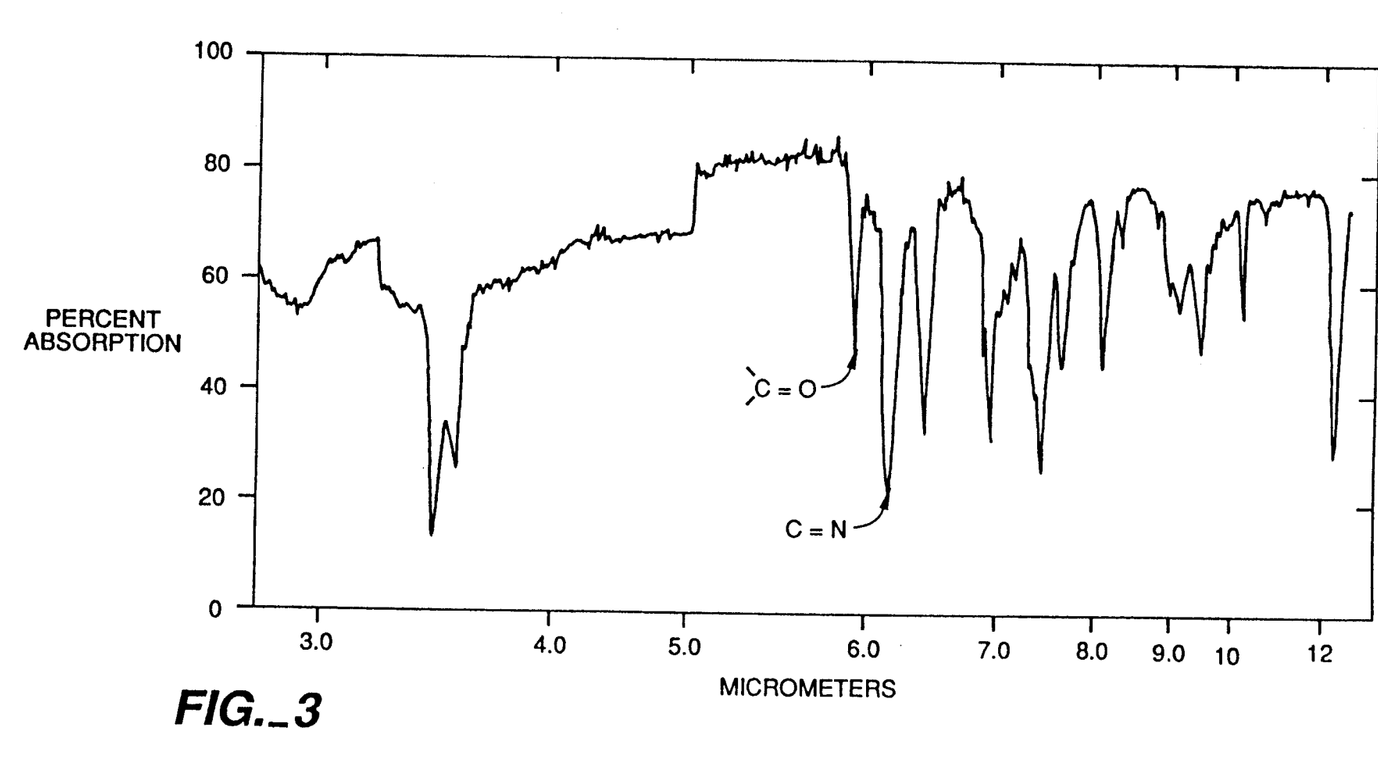
FIG. 3 is the infrared spectrum of the Schiff base polymer of 2,6 diacetylpyridine and 1,6-diaminohexane prepared in dimethylformamide.
Figure 4:
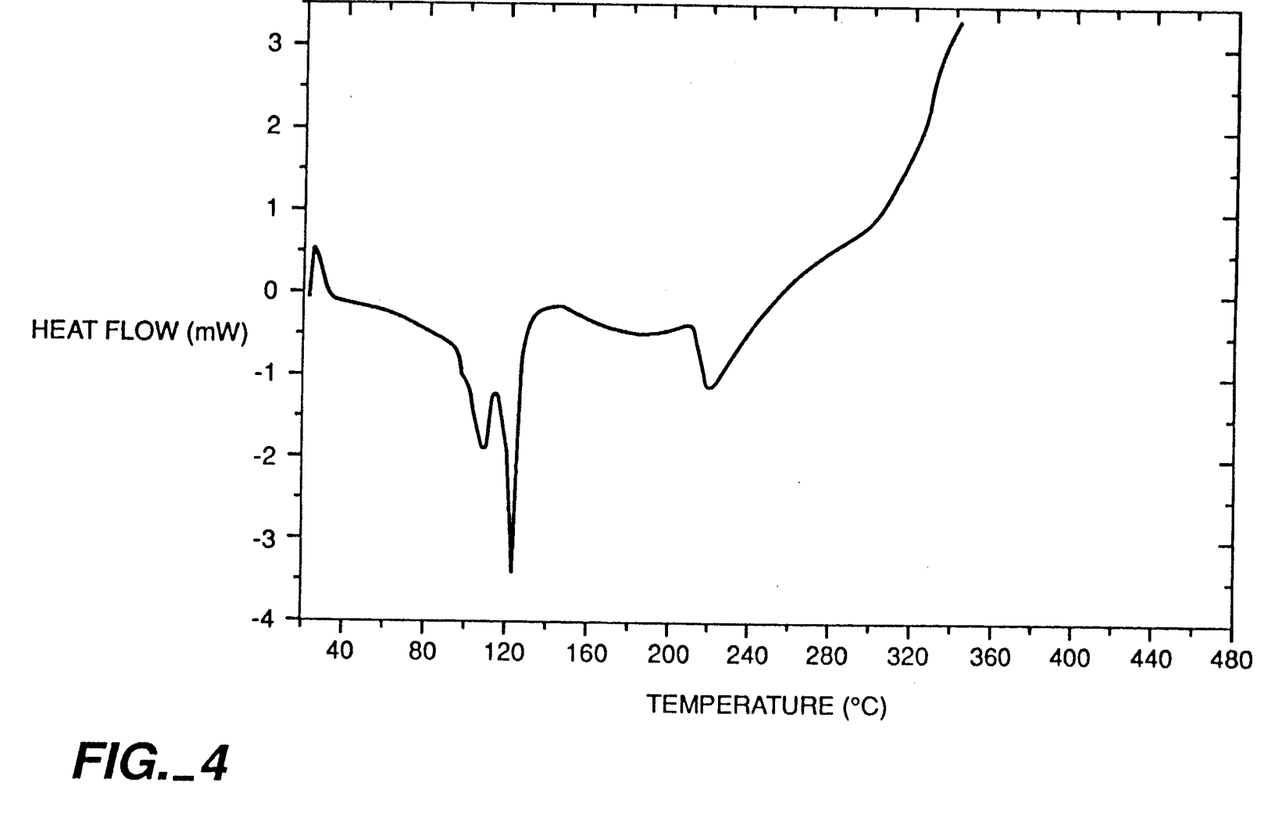
FIG. 4 is the differential scanning calorimetry (DSC) spectrum of the Schiff base polymer of 2,6-diacetylpyridine and 1,6-diaminohexane prepared in dimethylformamide, having the heat flow (mW) on the vertical axis and the temperature in degrees Centigrade on the horizontal axis.

(c) 1,6-Diaminohexane, 15.0 g (0.129 mol.) is dissolved in 100 ml of dimethylformamide and refluxed to obtain dissolution. 2,6-Diacetylpyridine 21.0 g (0.129) in 100 ml of dimethylformamide is added and the solution is refluxed for 2 hr. After cooling to 0° C. in an ice bath, the resulting solids are filtered, washed with cold dimethylformamide and dried in a vacuum - 20.9 g (66.8 percent yield). The infrared spectrum and DSC spectrum are shown as FIGS. 3 and 4 respectively.

EXAMPLE 2

Schiff Base Preparation

Polymer Prepared Under Anhydrous Conditions (Diamine and Diketone)

(a) The procedure of Lyons and Martin in Example 1(a) above was followed except that the reaction was performed in anhydrous dimethyl formamide. A lumpy dark solid was obtained.

(b) All glassware is dried. Molecular sieves are activated at 320° C. for 16 hr. 2,6-Diacetylpyridine is distilled from sodium hydroxide pellets under high vacuum and handled only in dry box blanketed with hydrogen.

To a 200 ml flask, fitted with a Soxlet extractor containing the molecular sieves (activated at 22° C.), is added dimethylformamide (100 ml) and 2,6-diacetylpyridine (2.02 g) and 1,6-diaminohexane (1.40 g). The reaction mixture is heated to reflux under water aspirator pressure of about 20 mmHg having a water vapor trap. After 3 hr. of reflux, the vacuum was removed and the reaction mixture was refluxed for 2-hr.

(c) In a 100ml flask is added 2.0 g of 2,6-diacetylpyridine, 1.42 g of 1,6-diaminohexane, 50 ml of N-methylpyrrolidone and 18 g of toluene. The flask is fitted with an azeotrope distillation head. The temperature of the head (pot) is allowed to achieve 120° C. and later 150° C. The azeotrope is collected and about 20 ml of toluene is removed. The water fraction is about 0.5 ml.

A gel like mass begins to precipitate at the last stage of the reaction. The precipitate is placed in methanol to remove solvent. The chunk product is rubbery and easy to separate by filtration. The filtrate only has a light color. The precipitate is rinsed with methanol and derived in a vacuum, 2.97 g, 90% yield (as a tough, rubbery substance).

EXAMPLE 3

Schiff Base Polymer Preparation

Polymer Prepared with Water Present (Diamine and Dialdehyde)

(a) The procedure of Lions and Martin J.A.C.S. 79, 2733-8 (1957) was followed in aqueous solution using 1.16 g of 2,6-pyridinedicarboxaldehyde, 1.0 g of 1,6-diaminohexane, and ethanol (20 ml). The Schiff base polymer obtained was a white solid 1.78 g, 96.5% yield. It appears to have fairly low molecular weight.

EXAMPLE 4

Schiff Base Polymer Preparation (Anhydrous)

Polymer Prepared Under Anhydrous Conditions (Diamine and Dialdehyde)

(a) In a procedure and apparatus similar to that described in Example 1(a), and of Lions and Martin described above, 2,6-pyridinedicarboxaldehyde, 1.48 g (0.011 mil) is combined with 1,6-diaminohexane 1.27 g (0.011 mol) in 20-ml of N-methylpyrrolidone and 18 ml of toluene. The reaction mixture is heated at reflux and the water is removed as an azeotropic mixture over 1 hr. The resulting Schiff base polymer has a high molecular weight, and when cast on a surface and the solvent removed, a tough rubbery polymer is obtained.

(b) Similarly, the procedure of Example 4(a) is repeated except that 1,6-diaminohexane is replaced with a stoicheometrically equivalent amount of hydrazine. A tough, rubbery polymer is obtained.

(c) Similarly, the procedure of Example 4(a) is repeated except that 1,6-diaminohexane is replaced with a stoichiometrically equivalent amount of 1,2-diaminoethane. A tough, rubbery polymer is obtained.

EXAMPLE 5

Addition of Iron to Schiff Base Polymer (Water Present)

Polymer Prepared With Water Present (Diamine and Dialdehyde)

(a) The general procedure of Lions and Martin (JACS), above was followed. Of iron (II) chloride, an aqueous solution is added 1 g of the polymer produced in Example 1(a). After stirring for 6 hr. a purple colored solution is obtained. After removal of the solvent, dark purple crumbly chunks are obtained. This crumbly powder-like polymer is attracted to a permanent magnet.

(b) Similarly, iron (II) is added to a polymer in the manner described above in Example 5(a), except that a stoichiometrically equivalent amount of the rubbery polymer of Example 2(a) is used. A dark purple crumbly powder is obtained which is attracted to a magnet.

EXAMPLE 6

Addition of Iron to Schiff Base

Polymers of Example 1

Polymer Prepared With Water Present (Diamine and Diketone)

(a) The Schiff base prepared in aqueous solution is described in Example 1 above. To 0.65 g of this Schiff base polymer is added $FeSO_4.7H_2O$ (1.8 g—an excess) in dimethylformamide (25 ml). A dark purple solution is obtained. After removal of the solvent, dark purple chunks are obtained. This material was attracted by a magnet.

(b) The procedure of Example 6(a) is repeated except that dimethylformamide is replaced with ethanol. Again, a dark crumbly powder is obtained. This material was attracted by a magnet.

(c) The procedure of Example 6(a) is repeated except that the DMF is replaced by toluene and the water is removed azeotropically. A tough polymer is expected to be obtained.

EXAMPLE 7

Addition of Iron to Schiff Base

Polymer of Example 2

Polymer Prepared Under Anhydrous Conditions (Diamine and Diketone)

(a) The Schiff base (2.0 g) of 2,6-diacetylpyridine and 1,6-diaminohexane was heated to dissolve in anhydrous refluxing dimethylformamide (25 ml). However, portions of the Schiff base would not dissolve and were filtered off. The iron salt, $FeSO_4.1.3H_2O$, 21.5 g was added. It was unclear whether or not a new precipitate was formed or the solids were iron salt. The final solids were a green-grey color, 2.77 g, equivalent to a 138.5% yield. This material is not attracted by magnet.

(b) The Schiff base polymer of Example 2(c) is treated with 2.5 g of $FeSO_4.2.5H_2O$ (dry) and the mixture is refluxed for a few hr. and filtered and dried. A dark powder was obtained, 112.4% yield having 15.2% iron by atomic absorption. This polymer is attracted to a magnet.

(c) The procedure of Example 7(b) is repeated except that 100 ml of DMF is added. It is expected that a magnetically attractive polymer will be obtained.

EXAMPLE 8

Addition of Iron to Schiff Base

Polymers of Example 3

Polymer Prepared in Presence of Water (Diamine and Dialdehyde)

(a) The Schiff base produced in Example 3(a) above (0.8 g) was treated with an excess of $FeSO_4.7H_2O$ (an excess) and 30 ml of deionized water. A dark colored powder was obtained, 1.35 g (168% yield). The solid show 7.6% iron present by atomic absorption analysis. This polymer is attracted to a magnet.

EXAMPLE 9

Addition of Iron to Schiff Base

Polymer of Example 4

Polymer Prepared Under Anhydrous Conditions (Diamine and Dialdehyde)

(a) The polymeric Schiff base produced in Example 4 above is a tough rubbery film. Iron (II) in the form of iron (II) sulfate $.7h_2O$ is added in aqueous solvent. After stirring for several hrs., the tough polymer is recovered and is not found to have a magnetic susceptibility. It is not attracted to a magnet.

EXAMPLE 10

Addition of Other Metals to Schiff Base Polymers (a) Cobalt ion as cobalt chloride $.6H_2O$ in dimethylformamide or ethanol was added to the polymer of Example 1(c). A paramagnetic susceptibility was observed.

(b) Nickel ion as nickel chloride $.6H_2O$ in dimethylformamide (dried over $MgSo_4$) was added to the polymer of Example 1(c). After refluxing for several hrs. the reaction mixture was filtered, cooled, and dried. The filtrate was a dark color and clear, 1.6 g (53.7% yield)

brown solid. A paramagnetic susceptibility was observed.

EXAMPLE 11

Diketones and Diamines (a) In a procedure similar to that described in Example 1(a) 2,6-diacetylpyridine, 5.1 g (0.031 mol) and hydrazine, 1.0 g (0.031) mol) are combined in 20 ml of dimethylformamide. The 2,6-diacetylpyridine dissolves quickly in the 20 ml of dimethylformamide and is refluxed for 3 hrs. The solution initially is clear and colorless but turns orange, then yellow. After 2-hr. a solid forms which was filtered, washed with dimethylformamide and methanol and dried—after standing overnight, solids in 98% yield are obtained. The solid is a pale yellow color which decomposes at temperatures greater than 250° C. The infrared spectrum of the dry powder is shown in FIG. 5.

Figure 6:
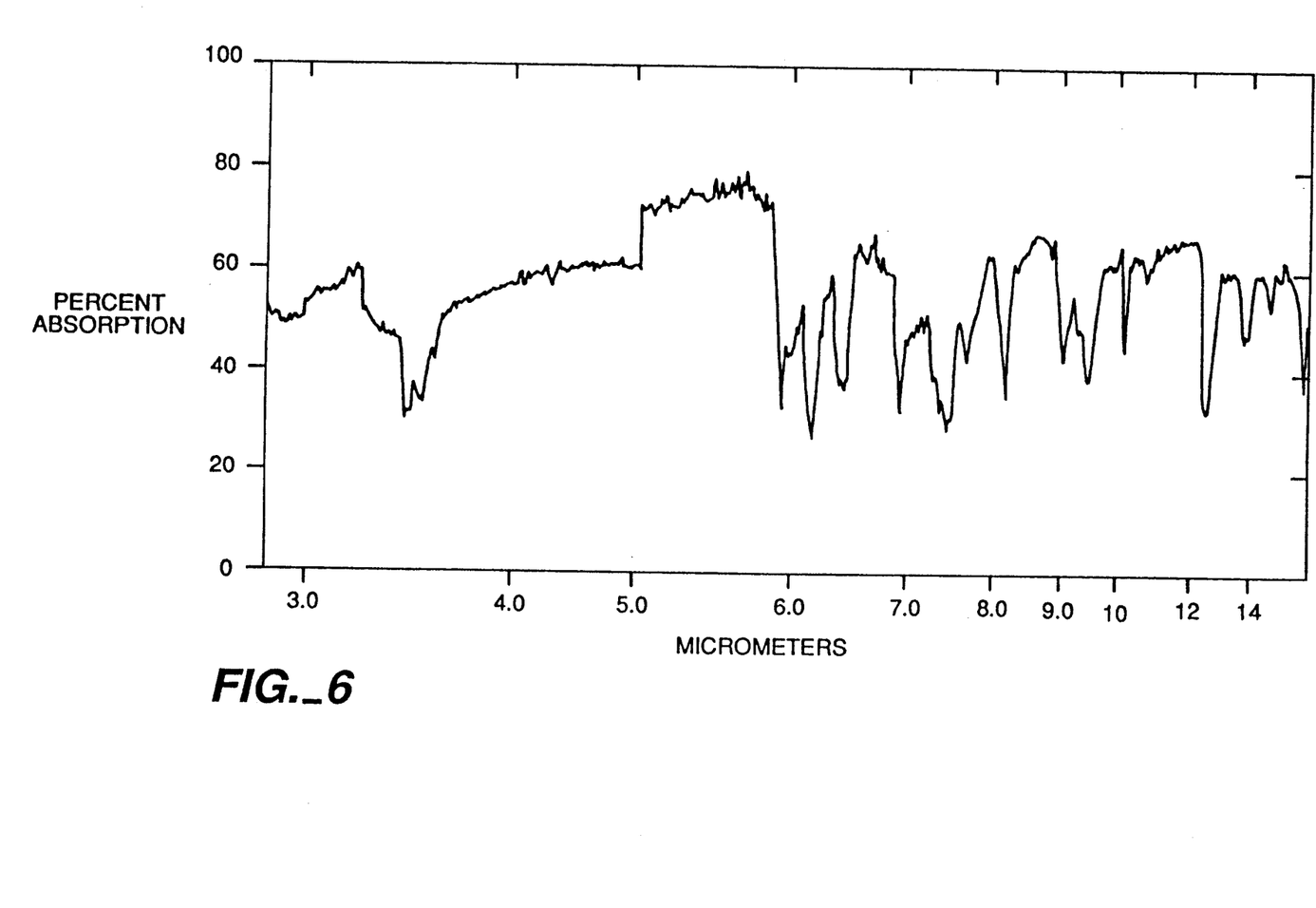
FIG. 6 is the infrared spectrum of the Schiff base polymer of 2,6-diacetylpyridine and 1,3-diaminopropane in dimethylformamide.

(b) Similarly, as is described in Example 11(a), the procedure is followed except that a stoichiometrically equivalent of 1,3-diaminopropane is used. The corresponding Schiff base polymer is obtained. The IR spectrum is shown in FIG. 6.

Figure 7:
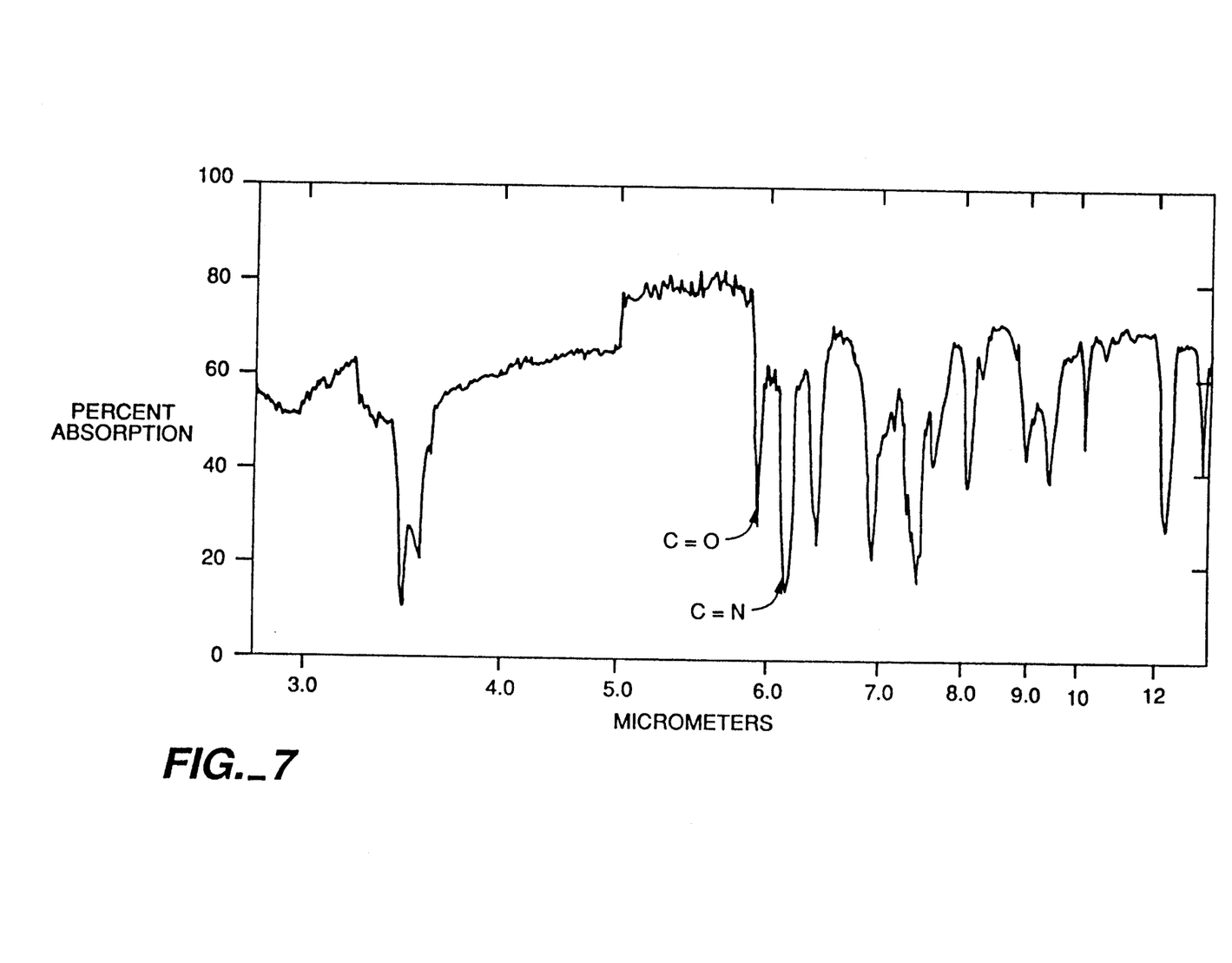
FIG. 7 is the infrared spectrum of the Schiff base polymer of 2,6-diacetylpyridine and 1,5-diaminopentane prepared in dimethylformamide.

(c) Similarly, as is described in Example 11(a), the procedure is followed except that a stoichiometrically equivalent of 1,5-diaminopentane is used. The corresponding Schiff base polymer is obtained. The IR spectrum is shown as FIG. 7.

Figure 8:
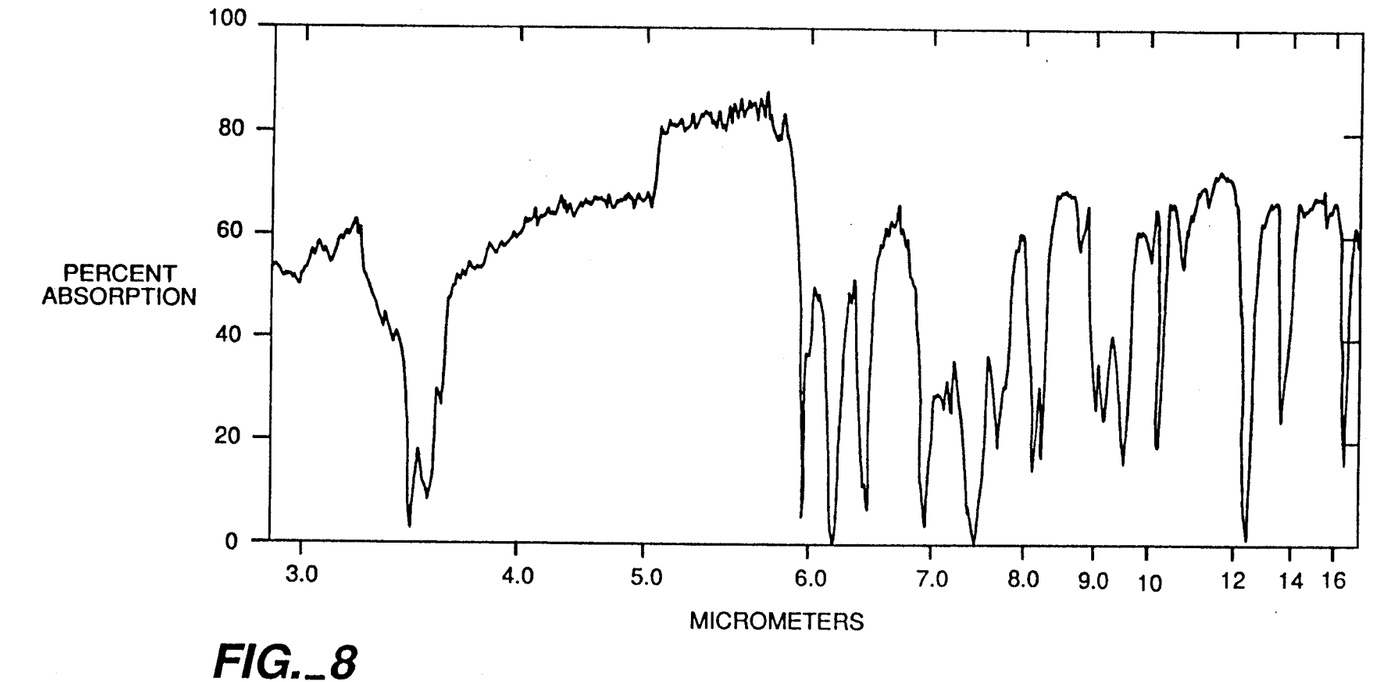
FIG. 8 is the infrared spectrum of the Schiff base polymer of 2,6-diacetylpyridine and 1,4-diaminobutane prepared in dimethylformamide.

(d) Similarly, as is described in Example 11(a), the procedure is followed except that a stoichiometrically equivalent of 1,4-diaminobutane is used. The corresponding Schiff base polymer is obtained. The IR spectrum is shown in FIG. 8.

EXAMPLE 12

Case Film of Polymer of Example 6(b)

Figure 9:
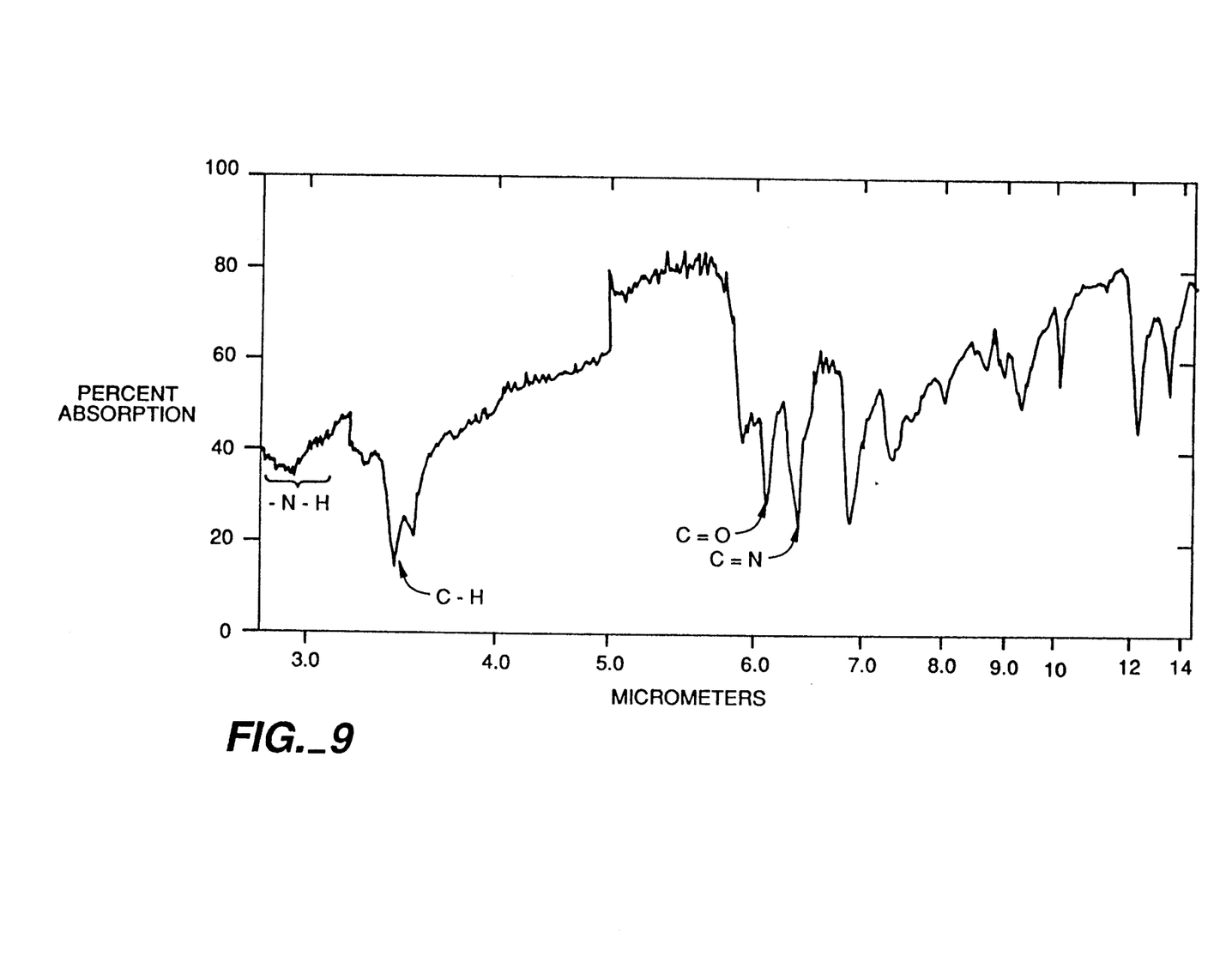
FIG. 9 is the infrared spectrum of the Schiff base polymer of 2,6-diacetylpyridine and 1,6-diaminohexane prepared in N-methylpyrrolidone.

(a) The Schiff base of Example 6(b) without iron present is cast on a surface and the solvent is removed. A tough rubbery polymer is obtained and cast into a thin film. See FIG. 9 for infrared spectrum.

(b) This polymer of subpart 12(a) was treated with iron (II) as iron (II) ammonium sulfate in four individual liquids deareated (i.e., air removed) water, dimethyl formamide, dimethylacetamide, or N-methylpyrrolidone.

(c) The polymer of subpart 12(b) is heated in air for 1-minute to 220° C. After cooling, a permanent residual enhanced magnetic susceptibility of $6 \times 10^{-4}$ cc/g is observed.

Figure 10:
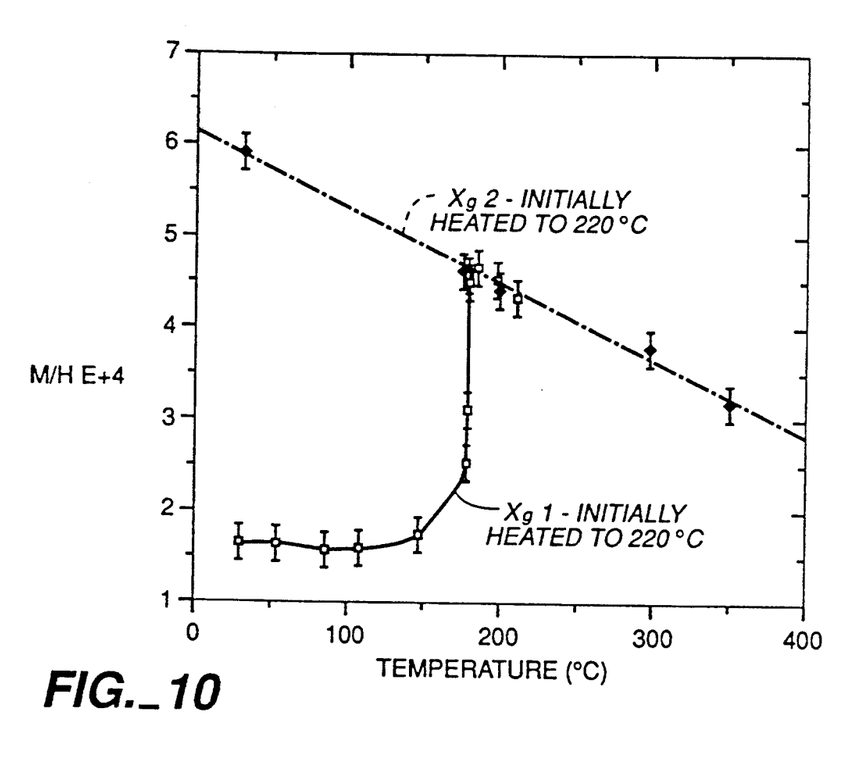
FIG. 10 is a plot of the magnetization of the iron (II) treated Schiff base polymer of 2,6-diacetylpyridine and 1,6-diaminohexane when heated from ambient ($-20°$ C.) to about 400° to about 400° C. The M/H E+4 is on the vertical axis and the temperature is in degrees Centigrade on the horizontal axis.

In FIG. 10 is shown the magnetic susceptibility at constant applied field (M/H) as a function of temperature for heating to 220° C. and held for 1-minute, surprisingly, the magnetic susceptibility increases from about $1 \times 10^{-4}$ to $6 \times 10^{-4}$ cc/g. Upon cooling to ambient temperature, the enhanced magnetic susceptibility is retained at about 5 times the original value. After the magnetic susceptibility peaks at about 200° C., further heating (to 400° C.) causes a decrease in magnetic susceptibility. (See FIG. 10.)

(d) It is expected that any of the Schiff base polymers prepared under anhydrous conditions (solvent) and particularly when the water, produced in the polymerization, is removed by azeotropic distillation to produce polymers have a molecular weight greater than 10,000.

When Fe(II) ammonium sulfate is added in aqueous solution (See Example 12(b)), and the obtained polymer-Fe(II) material is heated up to about 200° C. for about 1 minute and when cooled, is expected to exhibit 5 to 150 times the magnetic susceptibility of the original iron containing polymer.

The iron polymers are useful for the storage of magnetic information.

While the present invention has been described with reference to the specific embodiments thereof, it should be understood by those skilled in the art of magnetically conductive polymers, their fabrication and their use that various changes may be made and equivalents may be substituted without departing from the true spirit and scope of the present invention. In addition, many modifications may be made to adapt a particular situation, material, or composition of matter, process, process step or steps, or the present objective to the spirit and scope of this invention, with departing from its essential teachings.

We claim:

1. A method of use of a magnetically enhanced, organometallic polymer as the storage component for the magnetic storage of information in an optical magnetic device:

said polymer comprising a magnetically enhanced organometallic polymer having a molecular weight of between about 4,000 and 50,000 daltons, wherein said polymer comprises a multiplicity of Schiffs base tridentate chelating groups having the capacity to combine with the iron (II) or iron (III) ion of an inorganic salt, (a) combining at least one diamine selected from the group consisting of organic diamines and hydrazine with at least one organic carbonyl compound selected from the group consisting of diketones or dialdehydes in an anhydrous dipolar aprotic solvent for a time sufficient to produce the polymer at a temperature of between about 50° C. and 200° C.;

(b) recovering the polymer produced in step (a);

(c) combining the polymer of step (b) with an aqueous solution of an iron ion for a time sufficient to produce the iron-containing organometallic polymer;

(d) recovering the organometallic polymer of step (c);

(e) heating the organometallic polymer up to about 200° C. for a time sufficient to observe at least a five-fold increase in magnetic susceptibility which is retained when the organometallic polymer is cooled to ambient temperature or below; and (f) recovering the magnetically enhanced iron-containing organometallic polymer of step (e).

2. The method of use of the organometallic polymer of claim 1 wherein the final organometallic polymer is in a film form, and the solvent used in step (a) is heated under azeotropic conditions so that the water is removed from the reaction mixture.

3. The method of use of the organometallic polymer of claim 1 wherein the molecular weight of the final organometallic polymer is between about 10,000 and 25,000 daltons.

4. The method of use of the organometallic polymer of claim 1 comprising a magnetically enhanced organometallic polymer wherein the organic diamine segments of the polymer contain between 1 and 12 carbon atoms.

5. The method of use of the organometallic polymer of claim 4 wherein the organic diamine segments of the polymer have between 1 and 6 carbon atoms.

6. The method of use of the organometallic polymer of claim 4 wherein the organic diketone or dialdehyde is a heteroaromatic group having a nitrogen atom in it of the structure:

$R^5$ and $R^6$ are defined hereinabove,
wherein $R^2$ and $R^3$ are each independently selected from alkyl groups having from 1 to 12 carbon atoms.

7. The method of use of the magnetic polymer of claim 1 wherein the magnetic polymer is formed by the condensation of a dialdehyde or diketone of the structure:

and a diamine of the structure:

wherein in the dialdehyde or diketone
$R^1$ is a heteroaromatic group having a nitrogen atom of the structure:

wherein
$R^5$ and $R^6$ are each independently selected from:

—H, —CH$_3$, CH$_3$CH$_2$—, —F, —Cl, or —Br;

$R^2$ and $R^3$ are alkyl groups independently selected from hydrogen or from an alkyl group having from 1 to 12 carbon atoms;
$R^4$ is a direct nitrogen-nitrogen bond or is an alkylene group having from 1 to 12 carbon atoms.

8. The method of use of the magnetically enhanced organometallic polymer of claim 7 wherein $R^4$ is a direct bond.

9. The method of use of the magnetically enhanced organometallic polymer of claim 7 wherein $R^4$ is an alkylene having from 1 to 6 carbon atoms.

10. The method of use of magnetically enhanced organometallic polymer of claim 7 wherein $R^2$ and $R^3$ are each independently selected from alkyl having from 1 to 6 carbon atoms.

11. The method of use of the magnetically enhanced organometallic polymer of claim 7 wherein $R^2$ and $R^3$ are each hydrogen.

12. The method of use in the magnetic polymer of claim 7 wherein the final organometallic polymer is in a film form and the dipolar aprotic solvent in step (a) is heated under azeotropic conditions so such that the water is removed from the reaction mixture.

13. The method of use of the magnetically enhanced organometallic polymer of claim 1 wherein the magnetic polymer of step (f) has a molecular weight of between about 4,000 and 50,000 daltons, and the magnetic polymer comprises a multiplicity of Schiff's base tridentate chelating groups having the capacity to combine with the iron (II) or iron (III) ion of an inorganic salt, wherein the polymer is formed of at least one organic diamine or hydrazine with at least one organic diketone and dialdehyde, having a magnetic susceptibility of between about $1 \times 10^{-6}$ and $1.2 \times 10^{-3}$ cc/g, which is between about 5 and 150 times enhancement of the magnetic susceptibility as compared to the unenhanced organometallic polymer at ambient temperature.

14. The method of use of the organometallic polymer of claim 13 wherein the magnetic polymer is formed by the condensation of a dialdehyde or diketone of the structure:

and a diamine of the structure:

wherein in the dialdehyde or diketone
$R^1$ is a heteroaromatic group having a nitrogen atom of the structure:

wherein
$R^5$ and $R^6$ are each independently selected from:

—H, —CH$_3$, CH$_3$CH$_2$—, —F, —Cl, or —Br;

$R^2$ and $R^3$ are alkyl groups independently selected from hydrogen or from an alkyl group having from 1 to 12 carbon atoms;
wherein in the diamine
$R^4$ is a direct nitrogen-nitrogen bond or is an alkylene group having from 1 to 12 carbon atoms.

15. The method of use of the organometallic magnetically enhanced polymer of claim 14 wherein $R^4$ is a alkylene having from 1 to 6 carbon atoms.

16. The method of use of the organometallic magnetically enhanced polymer of claim 14 wherein $R^2$ and $R^3$ are each independently selected from alkyl groups having from 1 to 6 carbon atoms.

* * * * *